Patented Dec. 26, 1944

2,365,979

UNITED STATES PATENT OFFICE 2,365,979

FUMIGANT

William P. ter Horst, Pompton Plains, N. J., assignor to United States Rubber Company, New York, N. Y., a corporation of New Jersey No Drawing. Application October 6, 1943, Serial No. 505,194

5 Claims. (Cl. 167—39)

This invention relates to new and useful improvements in fumigants, more particularly to a material suitable for destroying or checking the growth or multiplication of fungi, bacteria and insects, the latter term being considered to include larvae, arachnids and acarids.

I have found that carbon suboxide, which has the formula $C_3O_2$ or $O=C=C=C=O$, is a fumigant useful for controlling the above mentioned lower organisms. The chemical and method of making it are described for example by Diels and Blumberg, Berichte, vol. 41, pages 82–86 (1908).

Carbon suboxide, more particularly a gas containing the same, may be introduced as a fumigant into enclosed spaces infested with fungi, bacteria or insects. Carbon suboxide may be used to fumigate dwellings, soil, warehouses, greenhouses, and the like, to free them of harmful organisms. The carbon suboxide may be used to fumigate plants such as citrus fruit trees to rid them of insect life. In such cases the tree may be covered by a tent and the gas containing carbon suboxide released within the tent. After standing for a suitable time, for example, 24 hours, the tent may be removed. Carbon suboxide may be used to fumigate other types of plants to rid them of fungus or bacterial growths. The term "plant" is used to include trees, shrubs, herbs, intact plants, transplants, slips, cuttings, tubers, bulbs, stems, foliage, fruit, flowers, buds and seeds.

The carbon suboxide is conveniently stored in metal cylinders and its vapor pressure is such that it can be released by opening the container above the liquid level of the contents, whereupon the carbon suboxide will evaporate. The amount of chemical used can be varied within wide limits, for example ½ to 5 lbs. per thousand cubic feet of space to be fumigated.

The following examples are given to illustrate the invention:

Example I

This example shows carbon suboxide to be a fumigant useful for control of insects.

Two bean plants about one week old contained in a 3" soil-filled pot were heavily infested with red spiders and then placed under a 16-liter bell jar. A small open glass container containing 10 second instar, 10 fourth instar and 10 adult Mexican bean beetles was also placed under the jar. One-half gram of liquid carbon suboxide chilled to below its boiling point (7° C.) and contained in an open glass vial was placed under the jar. The jar was placed on a flat glass surface and sealed with petrolatum. As the carbon suboxide warmed it volatilized thus permeating the atmosphere and contents of the jar in a concentration equal to 2 lbs. per 1000 cubic feet. When the jar was opened two hours after the carbon suboxide had evaporated, it was observed that 98% of the red spiders were dead as well as all the Mexican bean beetles, both the larvae and the adults.

Examples II and III illustrate the use of carbon suboxide as a fungicide.

Example II

Three potato tubers infested with *Rhizoctonia solani* were placed under a 16-liter bell jar together with an open vial containing sufficient carbon suboxide to be equivalent to 5.39 pounds per 1,000 cubic feet. The jar was made gas tight by placing it on a flat glass surface and sealing with petrolatum. After 24 hours the tubers were removed and ten sclerotia from the treated tubers (i. e., 3 from each of two tubers and 4 from the third) were plated on plain agar medium. At the same time 10 sclerotia from infested potatoes from the same lot, which had not been treated with the chemical, were plated on agar medium. After 10 days' incubation, it was observed that none of the sclerotia from the treated tubers were growing, whereas all 10 of the sclerotia from the untreated tubers were growing profusely.

Example III

Ten sclerotia previously isolated from a *Sclerotium delphinii* culture were plated on potato-dextrose agar. The agar medium was contained in a Petri dish of 5 inches diameter, the depth of the agar being ¼ inch. The plated sclerotia were fumigated precisely as were the tubers of Example II. After fumigation, they were incubated for ten days at which time it was observed that none of the sclerotia were growing. Ten sclerotia from the same culture of *Sclerotium delphinii* were plated on the same type of agar medium and incubated for the same period of time; however, not having been fumigated with the chemical of the invention, all grew profusely.

Example IV

This example illustrates the use of carbon suboxide as a bactericide.

A petri dish of 5" diameter containing potato-dextrose agar was inoculated with natural air flora by allowing it to remain open for 10 minutes. The open dish and its contents were then fumigated with the chemical precisely as were the tubers in Example II. After fumigation the culture was incubated for three days. A culture prepared in precisely the same way but not fumigated was incubated for the same period of time. Observations made at the end of the incubation period showed six colonies of bacteria and three of molds on the untreated culture and no colonies of microorganisms on the treated culture.

Having thus described my invention, what I claim and desire to protect by Letters Patent is:

1. The method of fumigating an enclosed space infested with lower organisms which comprises introducing into said space carbon suboxide.

2. The method of destroying fungus which comprises subjecting said fungus to contact with a gas containing carbon suboxide.

3. The method of destroying insects which comprises subjecting said insects to contact with a gas containing carbon suboxide.

4. The method of destroying bacteria which comprises subjecting said bacteria to contact with a gas containing carbon suboxide.

5. The method of controlling fungus on plants which comprises subjecting said plants to contact with carbon suboxide.

WILLIAM P. TER HORST.